United States Patent
Sachidanandam et al.

(10) Patent No.: US 10,430,024 B2
(45) Date of Patent: Oct. 1, 2019

(54) MEDIA ITEM SELECTION USING USER-SPECIFIC GRAMMAR

(71) Applicant: Microsoft Technology Licensing, LLC, Redmond, WA (US)

(72) Inventors: Vignesh Sachidanandam, Mercer Island, WA (US); Joe Downing, Redmond, WA (US); Cory Cirrincione, Bellevue, WA (US); Catherine Pham, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 253 days.

(21) Appl. No.: 14/079,409

(22) Filed: Nov. 13, 2013

(65) Prior Publication Data

US 2015/0134334 A1    May 14, 2015

(51) Int. Cl.
| | |
|---|---|
| G10L 15/22 | (2006.01) |
| G06F 3/0482 | (2013.01) |
| G06F 3/16 | (2006.01) |
| G06F 16/632 | (2019.01) |
| G06F 16/73 | (2019.01) |

(Continued)

(52) U.S. Cl.
CPC ............ *G06F 3/0482* (2013.01); *G06F 3/167* (2013.01); *G06F 16/433* (2019.01); *G06F 16/632* (2019.01); *G06F 16/73* (2019.01); *G10L 15/22* (2013.01); *G10L 15/193* (2013.01); *G10L 2015/223* (2013.01); *G10L 2015/227* (2013.01)

(58) Field of Classification Search
CPC ........ G06F 3/048; G06F 3/0482; G06F 17/00; G06F 17/30058
See application file for complete search history.

(56) References Cited

U.S. PATENT DOCUMENTS

| | | | |
|---|---|---|---|
| 5,475,366 | A | 12/1995 | Van Lente et al. |
| 8,478,592 | B2 | 7/2013 | Patel |

(Continued)

FOREIGN PATENT DOCUMENTS

| | | |
|---|---|---|
| CN | 101467142 A | 6/2009 |
| WO | 2007123798 A1 | 11/2007 |

OTHER PUBLICATIONS

Curin, Jan et al., "Voice-driven Jukebox with ECA Interface," Proceedings of the 13th International Conference on Speech and Computer, Jun. 2009, 6 pages.

(Continued)

*Primary Examiner* — Michael N Opsasnick
(74) *Attorney, Agent, or Firm* — Alleman Hall Creasman & Tuttle LLP

(57) ABSTRACT

A storage machine holds instructions executable by a logic machine to receive a digital representation of a spoken command. The digital representation is provided to a speech recognizer trained with a user-specific grammar library. The logic machine then receives from the speech recognizer a confidence rating for each of a plurality of different media items. The confidence rating indicates the likelihood that the media item is named in the spoken command. The logic machine then automatically plays back the media item with a greatest confidence rating.

18 Claims, 9 Drawing Sheets

(51) Int. Cl.
*G06F 16/432* (2019.01)
*G10L 15/193* (2013.01)

(56) References Cited

U.S. PATENT DOCUMENTS

| | | | | |
|---|---|---|---|---|
| 8,768,702 | B2* | 7/2014 | Mason | G06F 3/0482 |
| | | | | 345/177 |
| 9,015,588 | B2* | 4/2015 | Cassidy | H04L 47/36 |
| | | | | 715/704 |
| 2001/0005446 | A1* | 6/2001 | Uchikoga | G11B 20/00086 |
| | | | | 386/234 |
| 2006/0239131 | A1 | 10/2006 | Nathan et al. | |
| 2007/0233725 | A1* | 10/2007 | Michmerhuizen | G10L 13/08 |
| 2008/0156173 | A1 | 7/2008 | Bauer | |
| 2009/0019374 | A1* | 1/2009 | Logan | H04M 3/4872 |
| | | | | 715/753 |
| 2009/0150156 | A1* | 6/2009 | Kennewick | G06Q 30/0261 |
| | | | | 704/257 |
| 2010/0175026 | A1* | 7/2010 | Bortner | G06F 3/0481 |
| | | | | 715/818 |
| 2012/0089910 | A1* | 4/2012 | Cassidy | H04L 47/36 |
| | | | | 715/716 |
| 2013/0007043 | A1 | 1/2013 | Phillips et al. | |
| 2014/0181659 | A1* | 6/2014 | Kumar | H04N 21/44222 |
| | | | | 715/716 |

OTHER PUBLICATIONS

Paek, Tim et al., "Improving Command and Control Speech Recognition on Mobile Devices: Using Predictive User Models for Language Modeling," User Modeling and User-Adapted Interaction, vol. 17, Issue 1-2, Available as early as Apr. 21, 2006, 31 pages.

Sinha, Raja, "Voice Driven Media Player in C#," Code Project, www.codeproject.com/Articles/125401/Voice-Driven-Media-Player-in-C, Nov. 8, 2010, 5 pages.

"UsingYatse—Yatse, the Android Xbmc Remote and Widget," Leetzone.org, yatse.leetzone.org/redmine/projects/androidwidget/wiki/UsingYatse#Using-Yatse, Accessed: Aug. 2, 2013, 9 pages.

ISA European Patent Office, International Search Report and Written Opinion Issued in PCT/US2014/064717, Feb. 26, 2015, Netherlands, 10 Pages.

"Office Action Issued in European Patent Application No. 14812022.3", dated Jun. 1, 2018, 7 Pages.

"Office Action and Search Report Issued in Chinese Patent Application No. 201480062283.0", dated Jun. 15, 2018, 14 Pages.

"Office Action Issued in Chinese Patent Application No. 201480062283.0", dated Apr. 30, 2019, 11 Pages.

* cited by examiner

MEDIA ITEM SELECTION USING USER-SPECIFIC GRAMMAR

BACKGROUND

As digital media has become more pervasive, user media libraries have become more difficult to manage. It is not uncommon for a user to have a media library with tens or even hundreds of thousands of songs, movies, games, etc. Furthermore, various services provide users with the ability to instantly download and/or stream new media items. With so many options, it is difficult to provide a rewarding user experience in which a user is able to easily select one or more media items for playback.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A storage machine holds instructions executable by a logic machine to receive a digital representation of a spoken command. The digital representation is provided to a speech recognizer trained with a user-specific grammar library. The logic machine then receives from the speech recognizer a confidence rating for each of a plurality of different media items. The confidence rating indicates the likelihood that the media item is named in the spoken command. The logic machine then automatically plays back the media item with a greatest confidence rating.

DETAILED DESCRIPTION

The task of a user finding and playing back the right media item using a voice user interface (VUI) may require a trade-off among accuracy, number of steps, and intuitive and flexible speech utterances that may be required as part of the interface. Accuracy may be improved by requiring more process steps or limiting the allowable speech input, but may serve to deter the user from interacting with the VUI.

As described herein, by using a speech recognizer trained by a user-specific grammar library, accurate recognition of user speech may be obtained without many steps while allowing for the use of intuitive and flexible speech utterances as commands. The disclosed approach provides for quick playback of a media item with a greatest confidence rating, while allowing the user an intuitive path to select a specific media item in the scenario where no media item has a confidence rating above a threshold, or where the system selects a media item that does not match a user's expectations.

Figure 1:
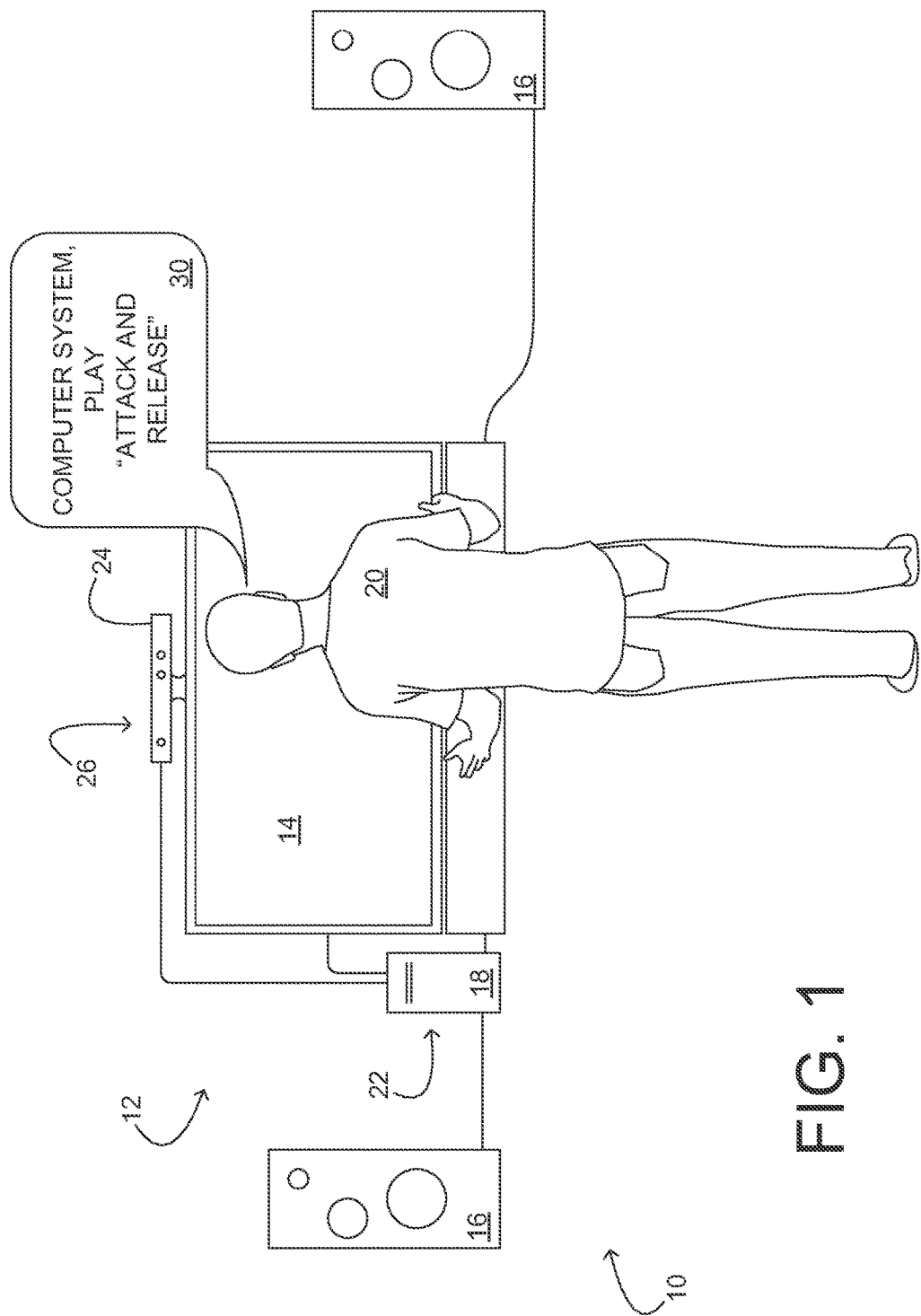
FIG. 1 shows a non-limiting example of an environment in which a user controls media item playback with spoken commands according to an embodiment of the present disclosure.

FIG. 1 shows aspects of an example control environment 10. The illustrated control environment is a living room or family room of a personal residence. However, the approaches described herein are equally applicable in other environments, such as retail stores and kiosks, restaurants, information and public-service kiosks, etc.

The environment of FIG. 1 features a home-entertainment system 12. The home-entertainment system includes a large-format display 14, and loudspeakers 16, both operatively coupled to computer system 18. In other embodiments, such as near-eye display variants, the display may be installed in headwear or eyewear worn by a user of the computer system. In other embodiments, the display may be a small-format display, such as a computer monitor, laptop computer screen, tablet computer screen, smart-phone screen, etc.

In some embodiments, computer system 18 may be a video-game system. In some embodiments, computer system 18 may be a multimedia system configured to play music and/or video. In some embodiments, computer system 18 may be a general-purpose computer system used for internet browsing and productivity applications—word processing and spreadsheet applications, for example. In general, computer system 18 may be configured for any or all of the above purposes, among others, without departing from the scope of this disclosure.

Computer system 18 is configured to accept various forms of user input from one or more users 20 via user input subsystem 22. As such, traditional user-input devices such as a keyboard, mouse, touch-screen, gamepad, or joystick controller (not shown in the drawings) may be operatively coupled to the computer system. Regardless of whether traditional user-input modalities are supported, user input subsystem 22 may also be configured to mediate so-called natural user input (NUI) and/or voice user input (VUI) from at least one user.

To mediate user input from the one or more users, user input subsystem 22 is useable by computer system 18. The user input subsystem is configured to capture various aspects of user input and provide corresponding actionable input to the computer system. To this end, the user input subsystem may receive low-level input from peripheral sensory components, which may include vision subsystem 24 and listening subsystem 26. In the illustrated embodiment, the vision system and listening system share a common enclosure; in other embodiments, they may be separate components. In still other embodiments, the vision, listening and user input subsystems may be integrated within the computer system. The computer system and the vision system may be coupled via a wired communications link, as shown in the drawing, or in any other suitable manner. Although FIG. 1 shows the sensory components arranged atop display 14, various other arrangements are contemplated as well. For example, user input subsystem 22 could be mounted on the ceiling or part of a head-mounted display system.

In the example shown in FIG. 1, user 20 is depicted as providing user input in the form of spoken command 30. In this example, the user is requesting the computer system to playback a media item. The term "media item" as used herein may refer to a digital media file, such as an audio file, a video file, or a mixed audio/video file (e.g., song, music video, movie, game, etc.). Spoken command 30 may include multiple command components. Spoken command 30 may include a primary command component, which directs the listening subsystem to engage in active listening mode (e.g. "Computer system"). Spoken command 30 may also include a secondary command component, which provides an application-specific command (e.g. "play"). In this example, the secondary command component indicates the user's desire to playback a media item. The application-specific command may result in computer system 18 launching an application, and/or determining a pathway for the command to be handled by computer system 18 and its components and subsystems, which may trigger one or more methods, such as the example methods shown in FIGS. 2-4. Spoken command 30 may include a tertiary component, where the user provides identifying information for the media item the user wishes the computer system to playback (e.g. "attack and release").

In some examples, spoken command 30 may not include each of the primary, secondary and tertiary command components. Rather, one or more command components may be inferred, or relayed to user input subsystem 22 through other user input modules. For example, the primary command asserting listening mode may be inferred based on a user's posture, gaze, etc. Listening mode may also be inferred through a user's engagement with computing system 18, or via the context of an application running on computing system 18. Additionally or alternatively, the user may command active listening mode through other user input modules, for example by pressing a button on a keyboard. Examples wherein spoken command 30 does not include a tertiary component are discussed further herein and with regards to FIG. 7.

Spoken command 30 may be received by one or more microphones included in listening subsystem 26. A digital representation of spoken command 30 may then be created by analog-to-digital conversion circuitry included in listening subsystem 26 and/or user input subsystem 22. The digital representation of spoken command 30 may then be presented to a logic machine included in computer system 18, as described further herein and with regards to FIGS. 2-4.

Computer system 18 may provide feedback to user 20 that spoken command 30 has been recognized and that the command is being processed. Feedback may include visual feedback presented on display 14 and/or audio feedback presented through loudspeakers 16. If spoken command 30 or the digital representation thereof does not contain enough information to prompt a specific response by computer system 18, computer system 18 may prompt user 20 to reiterate spoken command 30.

In some examples, the primary command component of spoken command 30 may also activate vision subsystem 24 to engage in an active data-capturing mode. Vision subsystem 24 may collect data pertaining to gestures performed by user 20, and/or data pertaining to facial movements performed while user 20 is uttering spoken command 30 which may compliment and refine speech recognition performed by computer system 18.

Spoken command 30 may be received and processed by computer system 18 while a media playback program or application is actively running, and/or may be received and processed by computer system 18 while another program or application is actively running. For example, user 20 may be actively engaged with a video game being played on home entertainment system 12 and deliver spoken command 30 with intent to listen to music through loudspeakers 16 without pausing or quitting the video game application.

Figure 2:
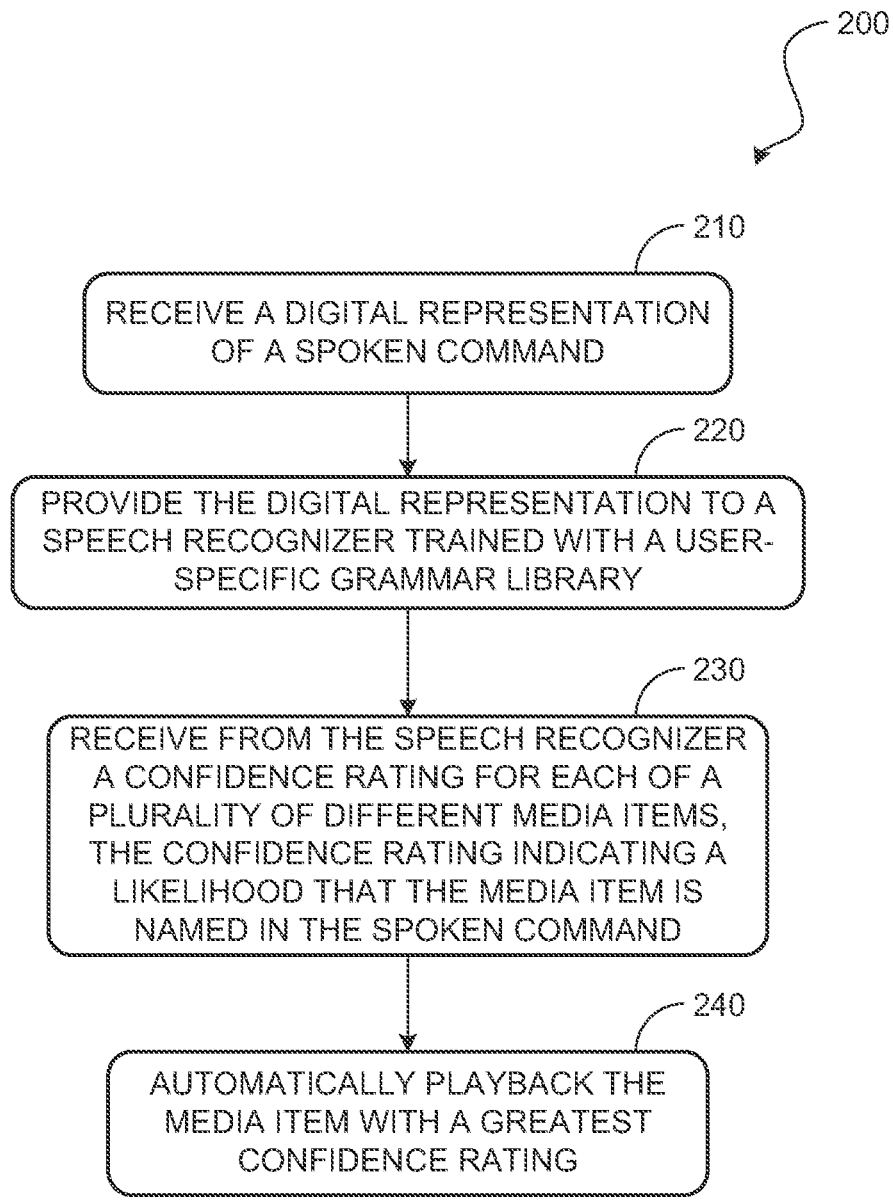
FIG. 2 is a flow chart illustrating a method for playback of a media item based on the spoken command of a user according to an embodiment of the present disclosure.
Figure 9:
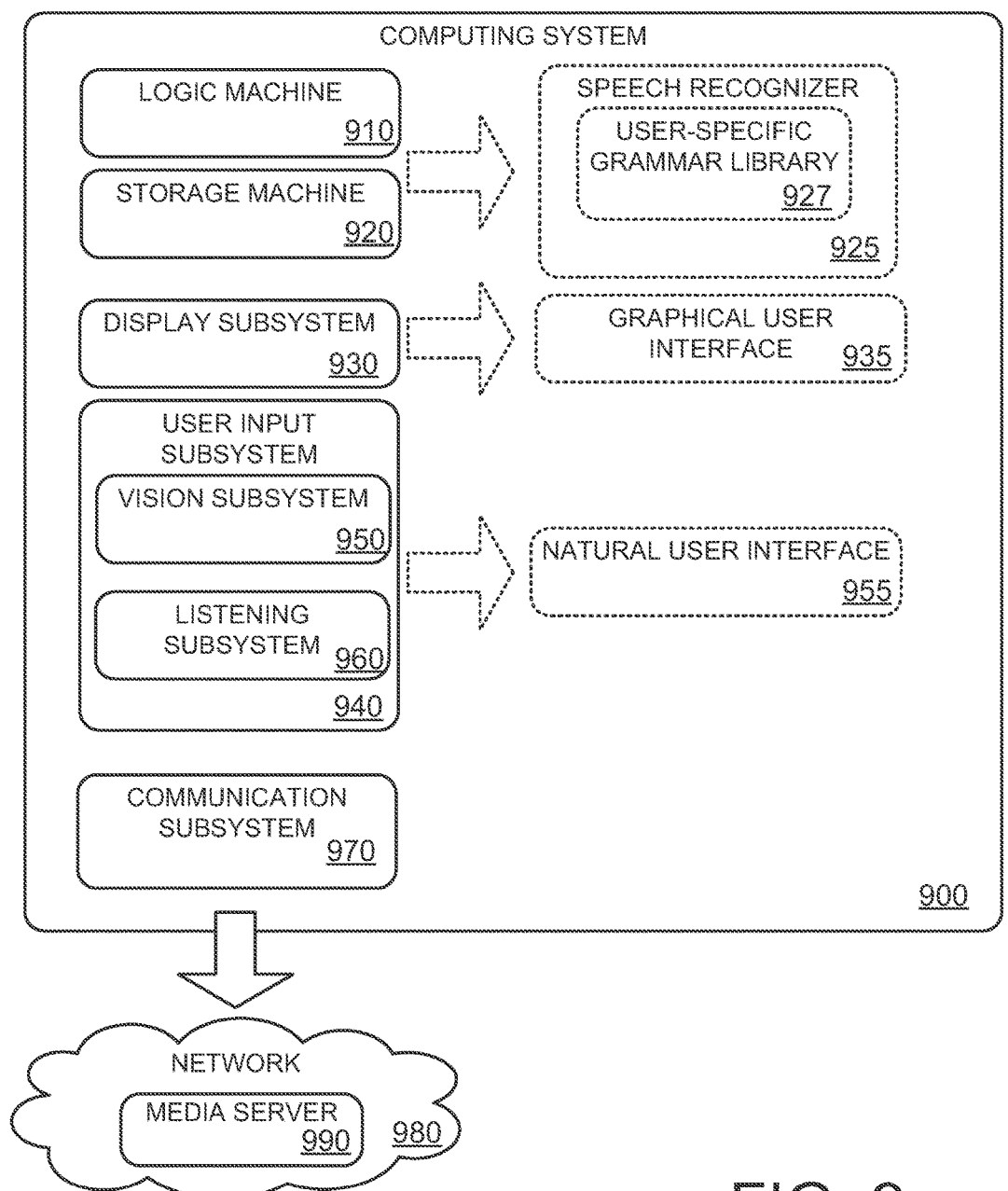
FIG. 9 schematically shows a computing system in accordance with an embodiment of the present disclosure.

FIG. 2 shows a flow chart for an example method 200 for playback of a media item based on the spoken command of a user. For example, method 200 may be used to playback a media item on home entertainment system 12 in response to user 20 delivering spoken command 30 as depicted in FIG. 1. Method 200 may be implemented in the form of instructions stored on a storage machine and executed by a logic machine, for example storage machine 920 and logic machine 910 as shown in FIG. 9. For example, computer system 18 may include a storage machine holding instructions for method 200 and a logic machine configured to execute the instructions.

At 210, method 200 may include receiving a digital representation of a spoken command. As discussed with regards to FIG. 1, spoken command 30 may be received by listening subsystem 26 and a digital representation of spoken command 30 may be created by listening subsystem 26 and/or user input subsystem 22.

At 220, method 200 may include providing the digital representation to a speech recognizer trained with a user-specific grammar library. For example, logic machine 910 may provide the digital representation to speech recognizer 925, as described further herein and shown in FIG. 9. The speech recognizer may be trained with a user-specific grammar library, which may contain identifiers related to media items available for playback by a computer system.

Figure 5:
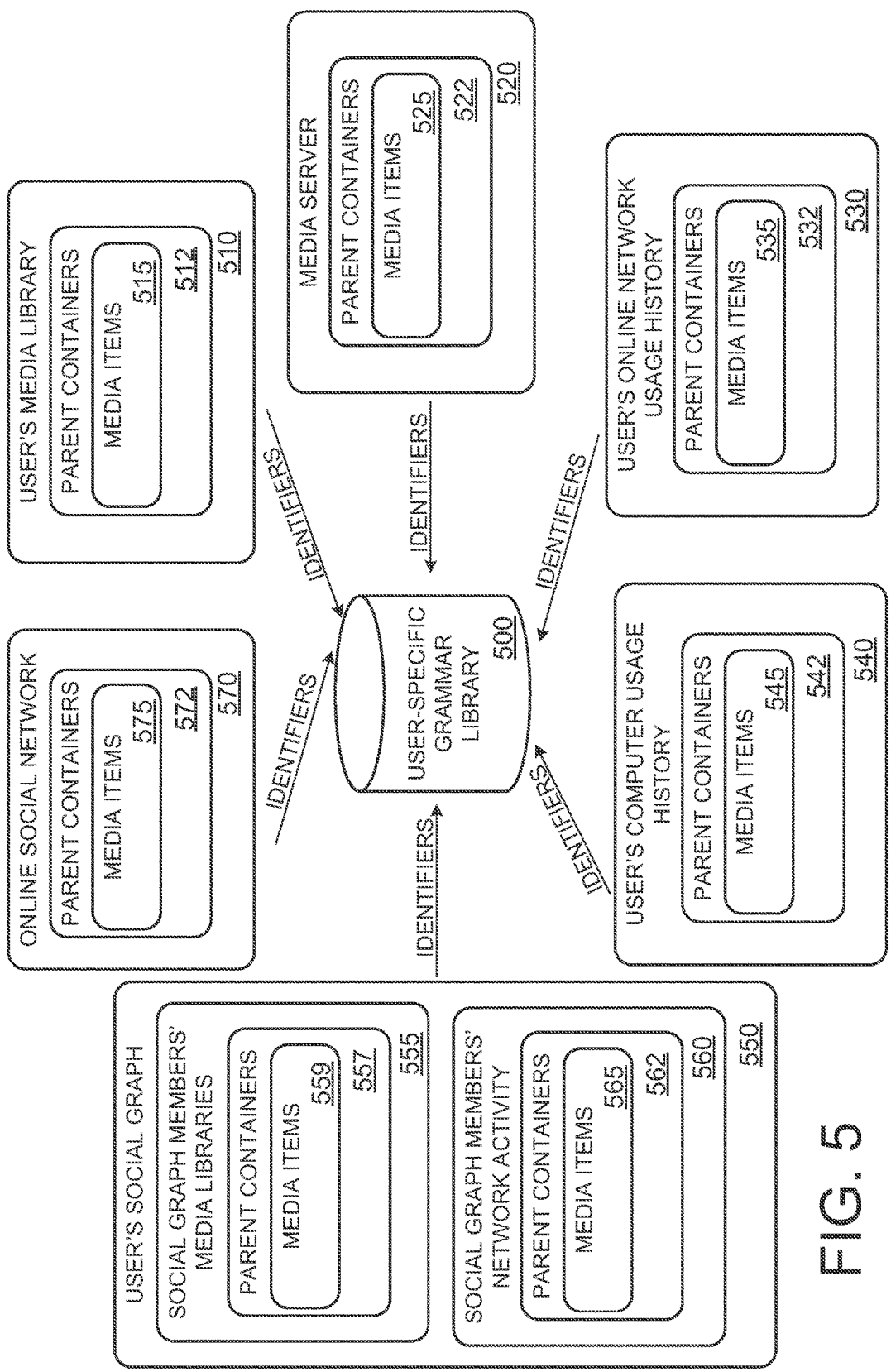
FIG. 5 schematically shows a user-specific grammar library in accordance with the present disclosure.

As described further herein, and shown in FIG. 5, user-specific grammar library 500 may include identifiers related to a plurality of media items and parent containers comprising the plurality of media items. For example, user-specific grammar library 500 may include item identifiers for a plurality of media items 515 in a user's media library 510. User-specific grammar library 500 may further include parent container identifiers for a plurality of parent containers 512 comprising the plurality of media items 515 in a user's media library 510.

In some embodiments, computer system 900 may include a communications subsystem 970, as shown in FIG. 9. Through the communications subsystem, the computer system may access a media server 520 via a network. User-specific grammar library 500 may thus include item identifiers for a plurality of media items 525 accessible via media server 520. User-specific grammar library 500 may further include parent container identifiers for a plurality of parent containers 522 comprising the plurality of media items 525 accessible via media server 520. Media server 520 may include media items available to purchase and/or accessible for playback without purchase. Media server 520 may include media items available to download and/or media items available for playback via streaming services. For example, media server 520 may comprise an on-line music catalog focused on popular music for the user's locale. User-specific grammar library 500 may thus include parent container identifiers and media item identifiers for albums, artists, playlists, songs, etc. available in the music catalog.

User-specific grammar library 500 may also contain item identifiers and parent container identifiers for media items accessible via and/or mentioned in a user's online network history 530, a user's computer usage history 540, a user's social graph 550, and/or one or more online social networks 570. A more detailed discussion of components of the user-specific grammar library 500 is discussed further herein and with regards to FIGS. 5 and 6.

Returning to FIG. 2, at 230 method 200 may include receiving from the speech recognizer a confidence rating for each of a plurality of different media items, the confidence rating indicating a likelihood that the media item is named in the spoken command. For example, the speech recognizer may use string transliteration to match phonetic strings, (e.g. syllables, words, and phrases) identified in the digital representation of a user command to item identifiers and parent container identifiers for actual media items in the user's media library and/or media items accessible via the media server.

Figure 6:
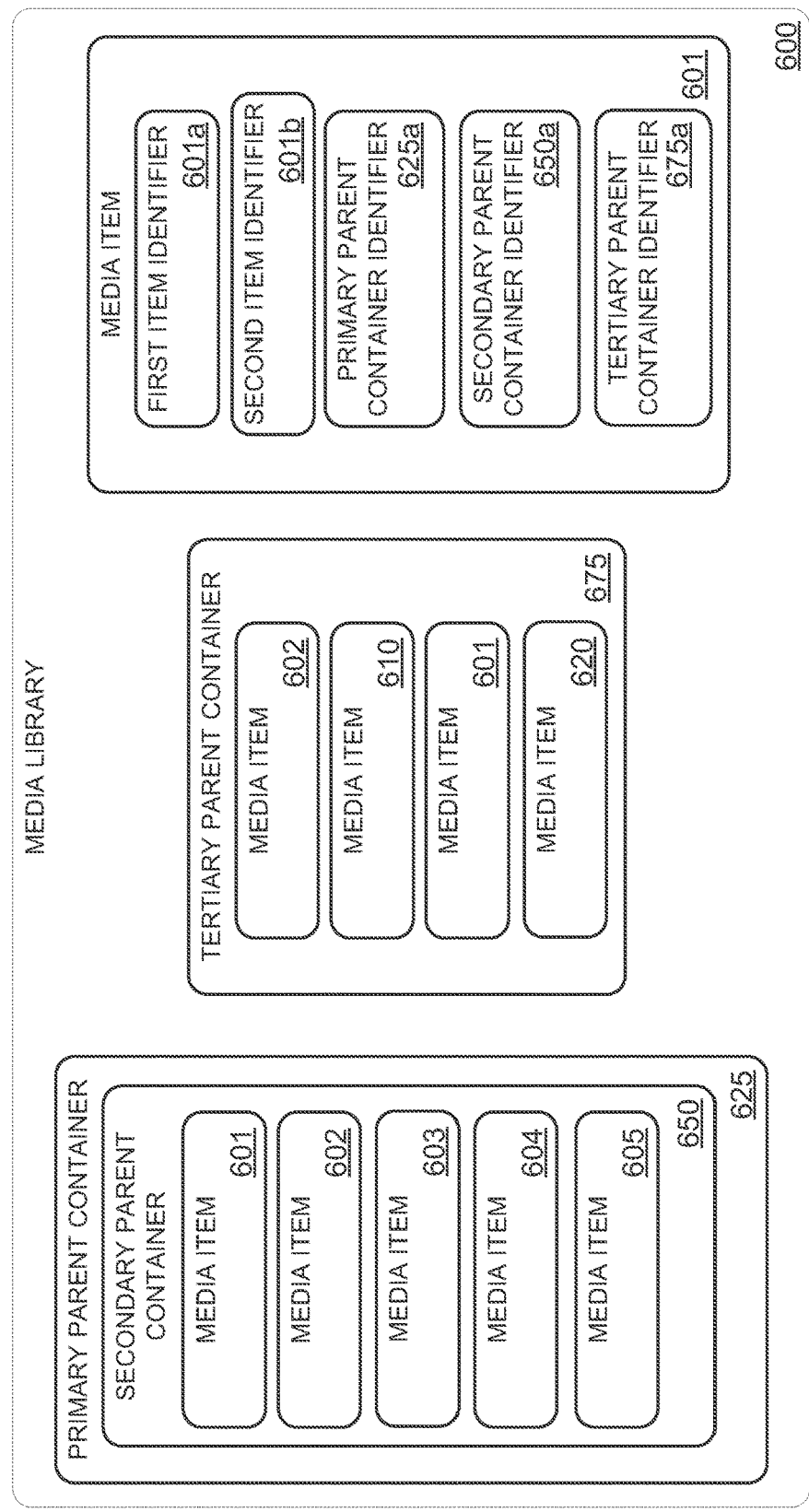
FIG. 6 schematically shows a media library comprising a plurality of media items and parent containers in accordance with the present disclosure.

As shown in FIG. 6, each media item 601 found in a media library 600 (either the user's media library or a media library accessible through a media server) may contain a plurality of item identifiers and parent container identifiers. For example, each media item may be a digital audio file representing a different song. Media item 601 may have a first item identifier 601$a$ representing the song title, for example. A plurality of media items may be included in a same parent container. For example, primary parent container 625 may represent a musical artist. Media items common to this musical artist may share a primary parent container identifier 625$a$. Each primary parent container 625 may further comprise a plurality of secondary parent containers 650. For example, secondary parent container may represent an album by the musical artist represented by parent container 625. Media items common to this album may thus share a secondary parent container identifier 650$a$. Each media item in a parent container may include a second item identifier to further distinguish the different media items. For example, media item 601 may have a second item identifier 601$b$, representing that media item 601 is the first song on the album represented by secondary parent container 650. Similarly media item 602 may be identified as the second song on the album, media item 603 identified as the third song, etc. Other item identifiers may include media item length, a user's rating for the media item, or other tangible information relating the media item to the user, to members of the user's social network, etc. (discussed further herein and with regards to FIG. 5).

Media items from multiple primary and/or secondary parent containers may be grouped together into a tertiary parent container, such as a playlist. For example, tertiary parent container 675 includes media items 601 and 602 from primary parent container 625 and secondary parent container 650, as well as media items 610 and 620. As such, media item 601 includes a tertiary parent container identifier 675$a$. Media items comprising a tertiary parent container may include item identifiers specific to the tertiary parent container, such as a song's position in the playlist, cross-fade information, etc. The same media item may appear in numerous tertiary song containers. Tertiary parent container identifiers may further include year of publication, record producer information, or other identifiers that may be applied by either the user or the media file generator.

Returning to FIG. 2, the speech recognizer may use the item identifiers and parent container identifiers comprising the user-specific grammar library to determine a confidence rating for each of a plurality of media items. For example, the speech recognizer may use string transliteration to drive a "fuzzy match" against the media items in the user's library and/or media items available via a media server. The "fuzzy match" may be used to match phonetic strings identified in the digital representation of a user command to item and parent container identifiers in the user-specific grammar library. In some embodiments, media items in the user's collection may be weighted more heavily than media items available via a media server, if and when fuzzy match results against a user's media library are merged with fuzzy match results against media items available via the media server.

Continuing at 240, method 200 may include automatically playing back the media item with a greatest confidence rating. In this way, a user can say something as simple as "Play <song name>" and be taken directly into playback for the best match media item for the term from the user's music library and/or the best match media item for the term from a media server.

In many scenarios, a user may have multiple media items in their library with similar or identical item identifiers as well as multiple parent containers in their library with similar or identical parent container identifiers. Further, a user-specific grammar library may include similar or identical terms used for both media item identifiers and parent container identifiers.

Figure 3:
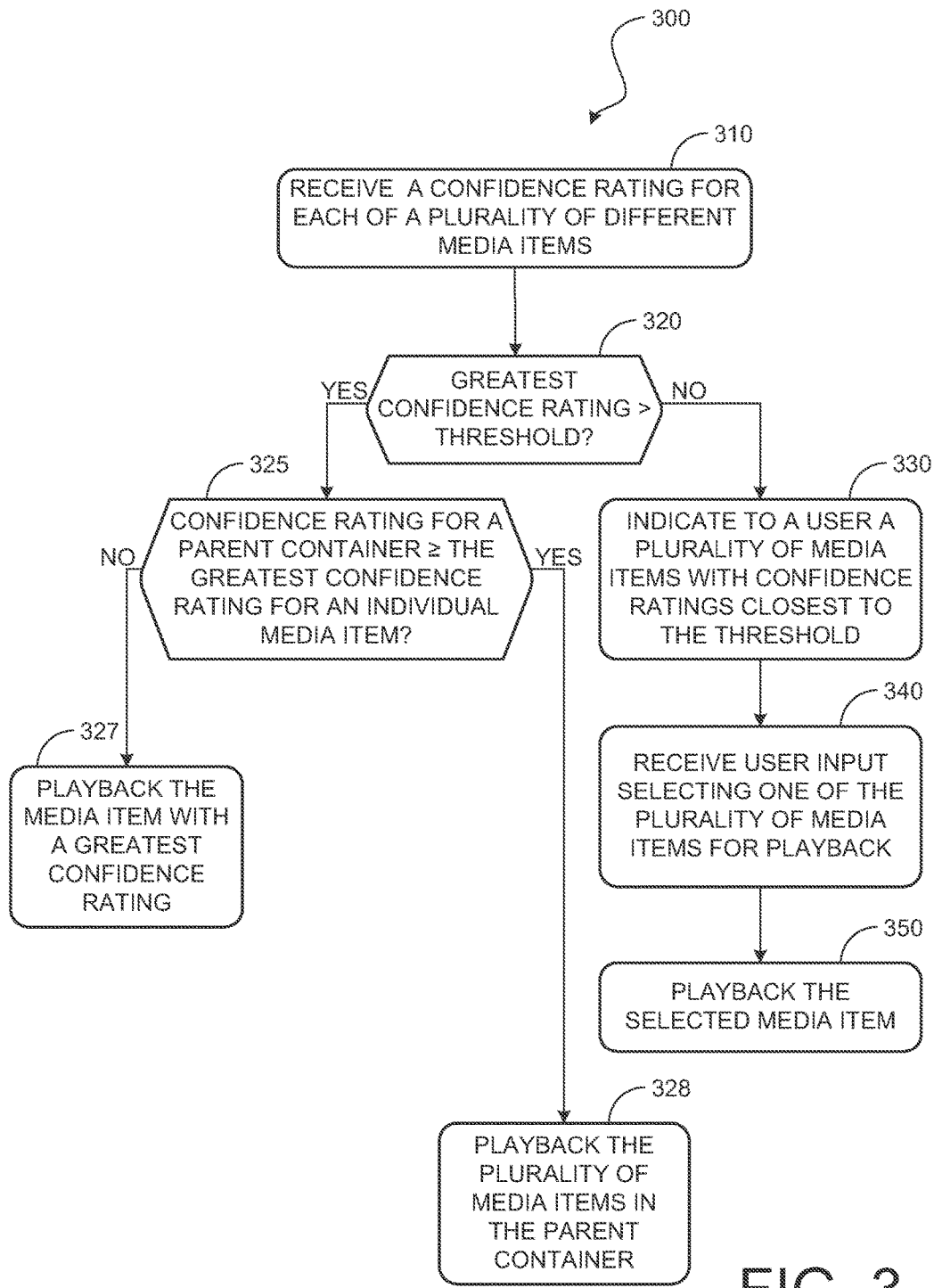
FIG. 3 is a flow chart illustrating a method for interpreting and reconciling ambiguous results according to an embodiment of the present disclosure.

FIG. 3 shows a flow chart for an example method 300 for interpreting and reconciling ambiguous results. For example, method 300 may be used to reconcile ambiguous results from a logic machine implementing method 200 as described herein and with regards to FIG. 2. Method 300 may be implemented in the form of instructions stored on a storage machine and executed by a logic machine, for example storage machine 920 and logic machine 910 as shown in FIG. 9. For example, computer system 18 may include a storage machine holding instructions for method 300 and a logic machine configured to execute the instructions. Method 300 may be run as a subroutine of method 200, or may be run independently.

At 310, method 300 may include receiving a confidence rating for each of a plurality of different media items. The confidence rating may be received from a speech recognizer, search engine, or module that considers a collective confidence of speech recognition and search recognition. The confidence ratings may be received for media items located in a user's library and/or on a media server. The confidence ratings may be expressed as a percentage, ranking, or other suitable format.

At 320, method 300 may include determining whether the greatest confidence rating for a media item is greater than a threshold. This may include the confidence ratings for individual media items, as well as the confidence ratings for parent containers. The threshold may be a predetermined confidence rating, and may be based on both the confidence of the speech recognition and the confidence of the search recognition. If a plurality of media items and/or parent containers have confidence ratings greater than the threshold, the media item or plurality of media items comprising a parent container with the greatest confidence rating may be queued for automatic playback.

If the greatest confidence rating for a media item and/or a parent container is greater than a threshold, method 300 may proceed to 325. At 325, method 300 may include determining whether a confidence rating for a parent container is greater than or equal to the greatest confidence rating for an individual media item. In this way, the system may weight or prioritize parent containers over individual media items when determining which media item to playback. For example, for music files, priority may be given to playlists, then artists, then albums, then individual songs. In some embodiments, the user may be allowed to set user preferences to determine parent container priority. For example, if the user typically listens to albums, priority may be given to albums with a confidence greater than or equal to the confidence rating for a playlist, artist, or song. A separate user preference may be set for scenarios where the highest confidence rating is given to a parent container representing an artist. For example, the user may indicate a preference to play all songs from the artist randomly, sequentially by album title, sequentially by release date, etc.

If no parent container has a confidence interval greater than or equal to the greatest confidence rating for an individual item, method 300 may proceed to 327. At 327, method 300 may include automatically playing back the media item with the greatest confidence rating when the greatest confidence rating is larger than a threshold.

Returning to 325, if a parent container has a confidence interval greater than or equal to the greatest confidence rating for an individual item, method 300 may proceed to 328. At 328, method 300 may include playing back the plurality of media items in the parent container. As described above, for music files, the parent container may be a playlist, album, artist, or other assigned parent container. A user preference may determine whether the parent container should be played randomly or sequentially.

Returning to 320, if no media item or parent container has a confidence rating greater than a threshold, method 300 may proceed to 330. At 330, method 300 may include indicating to a user a plurality of media items with confidence ratings closest to the threshold. For example, all confidence ratings for media items and parent containers may be ranked, and a subset of media items and parent containers with the highest threshold ratings may be presented to the user.

Figure 7:
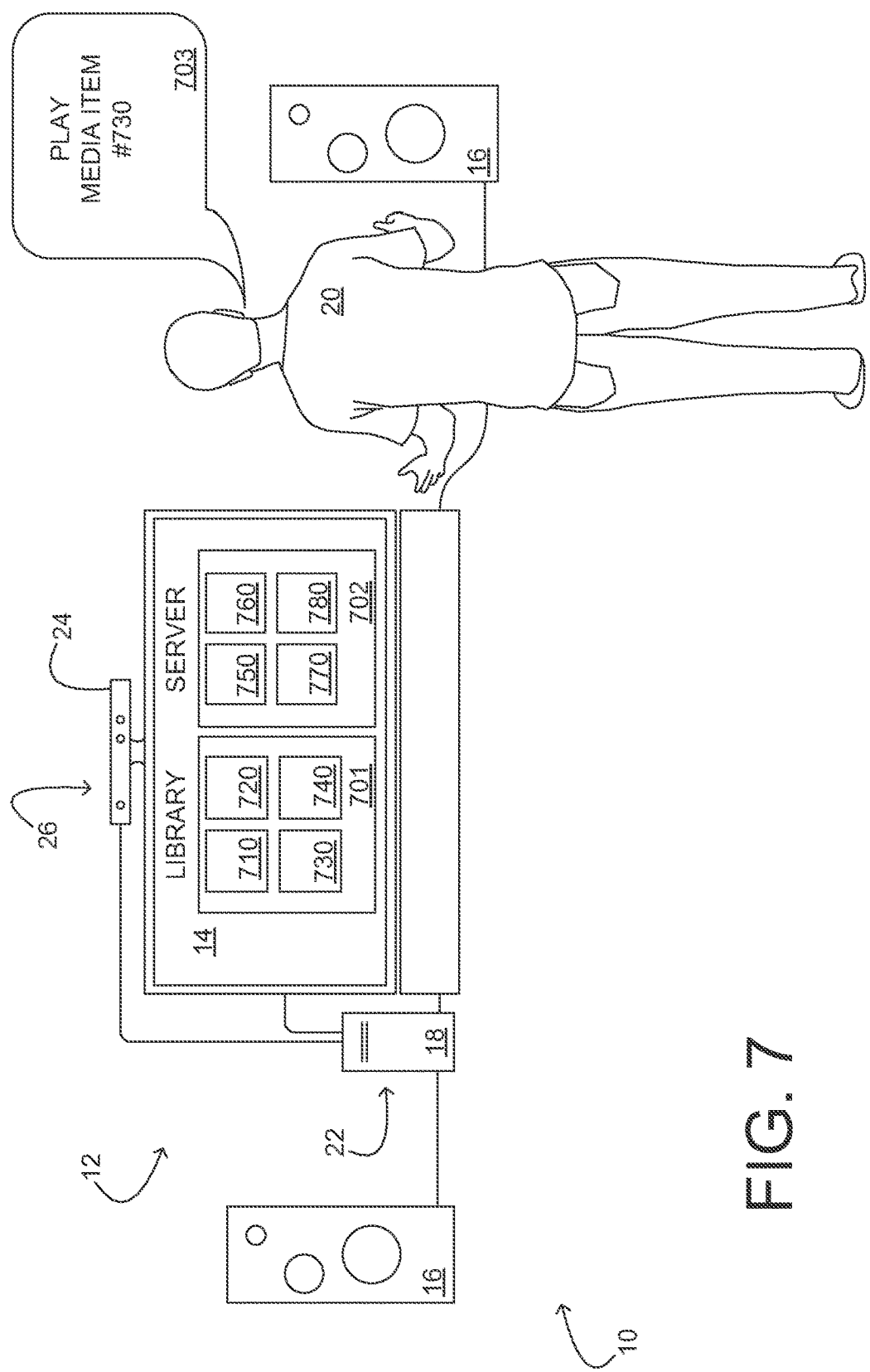
FIG. 7 schematically shows a control environment where a display is configured to indicate a plurality of media items available for playback in accordance with an embodiment of the present disclosure.

FIG. 7 shows an example of a control environment where a display is configured to indicate a plurality of media items for presenting a plurality of media items to a user. This configuration may be referred to as a "disambiguation mode". In this example, a plurality of media items located in a user's library (701) are presented alongside a plurality of media items available on a media server (702). In other examples, media items located in a user's library may be presented intermingled with media items available on the media server. In some examples, such as when computer system 18 is operating in an offline mode, only media items from a user's library may be presented. The media items may be presented in order of confidence rating, or may be presented in a sequential order (such as alphabetical order) if numerous media items have equal or similar confidence ratings. Individual media items may be presented alongside parent containers with similar confidence ratings. The VUI labels for these items may be configured to proactively disambiguate the items to allow media items with similar sounding names to be selected correctly when appearing on the same screen. In some examples, unique identifying information may be appended to the normal display string (e.g. a song title). If this still results in similar sounding items, media items may be identified numerically. For example, FIG. 7 shows media items 710, 720, 730, and 740 as selections from the user's library, and media items 750, 760, 770, and 780 available from the media server.

In some examples, the plurality of media items with the greatest confidence ratings may be presented in a non-visual manner. For example, if the user is engaged in a video game, a list of media items may be presented aurally through loudspeakers 16, so as not to disrupt presentation of the GUI presented on display 14.

Returning to FIG. 3, after indicating a plurality of media items with confidence ratings closest to the threshold, method 300 may proceed to 340. At 340, method 300 may include receiving user input selecting one of the plurality of media items with confidence ratings closest to the threshold for playback. User input may include speech input, gesture input, and/or input from traditional user-input devices such as a keyboard, mouse, touch-screen, gamepad, or joystick controller operatively coupled to the computer system.

As shown in FIG. 7, user input may include speech input in the form of speech command 703. As described for spoken command 30 as shown in FIG. 1, speech command 703 may include a primary command component, which directs the listening subsystem to engage in active listening mode, a secondary command component which provides an application-specific command (e.g. "play") and a tertiary component, where the user provides identifying information for the media item the user wishes the computer system to playback (e.g. "media item 730"). In this example, listening subsystem 26 is configured to be automatically engaged in active listening mode upon entering disambiguation mode. As such, speech command 703 may not necessarily include a primary command component.

As described with regards to FIG. 1, user input subsystem 22 may be able to infer one or more command components, and may be able to receive one or more command components via vision subsystem 24 and/or other user input modules. For example, vision subsystem 24 may use gaze tracking to determine which media item presented on display 14 is being looked at by the user. The user may simply say "play" and look at a media item to begin playback. In some embodiments, the media item indicated with the greatest confidence rating may automatically playback upon the user saying "play".

In some examples, the user may not identify the media item desired for playback among the plurality of media items presented. The user may then request additional or alternative media items with a command, such as a speech command (e.g. "show more examples"), or with a gesture, such as a swiping gesture. A plurality of media items with the next greatest confidence ratings may then be indicated to the user. During the disambiguation mode, the user may re-input the initial user command requesting a media item for playback, if the user identifies that the indicated media items reflect a misinterpreted command. In some examples, computer system 18 may prompt the user to re-input the initial user command if no media item or parent container receives a confidence rating above a baseline threshold.

Returning to FIG. 3, after receiving user input selecting one of the indicated plurality of media items for playback, method 300 may proceed to 350. At 350, method 300 may include playing back the selected media item, or playing back a plurality of media items included in a selected parent container.

Figure 4:
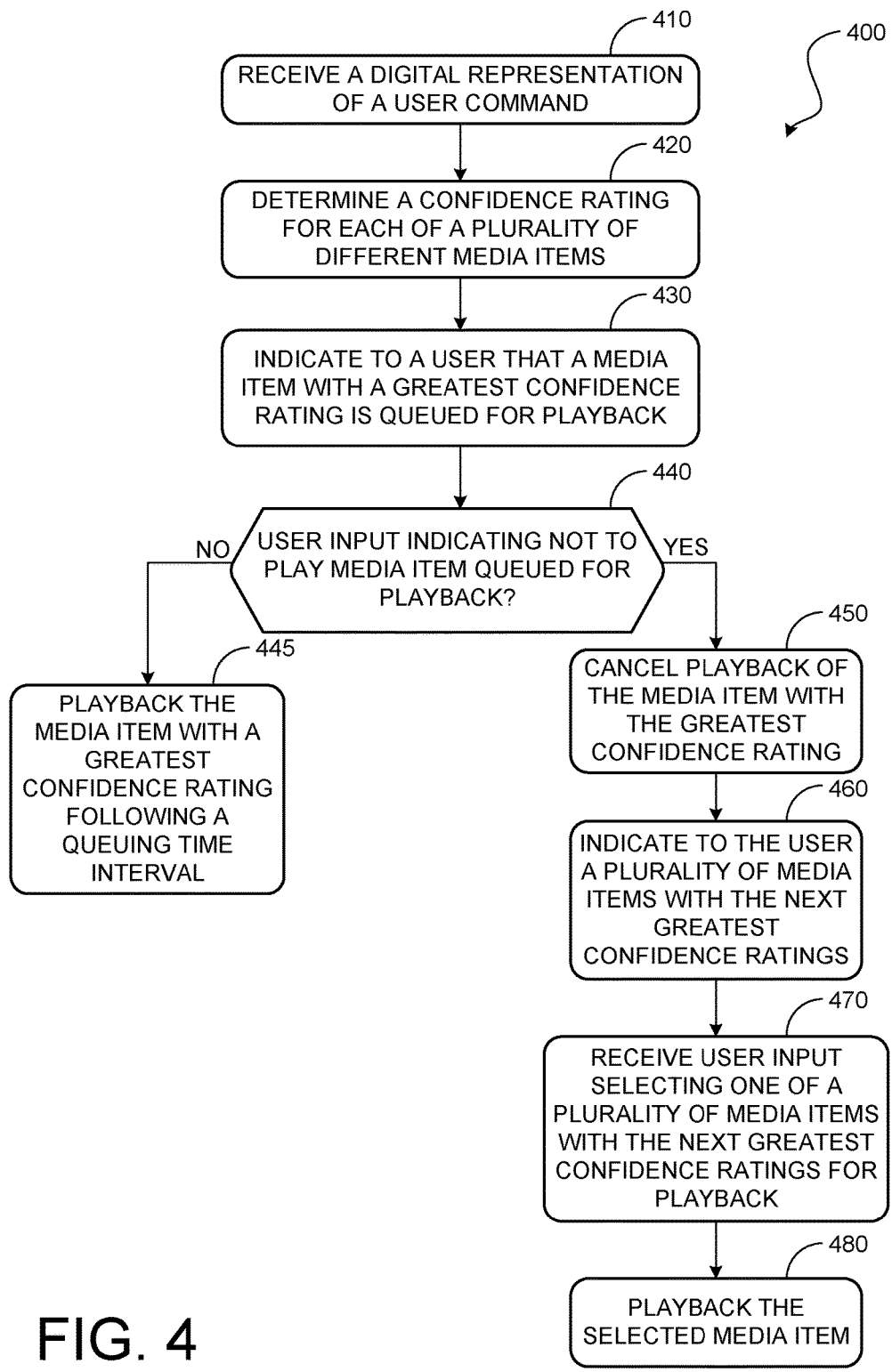
FIG. 4 is a flow chart illustrating a method for receiving and responding to user input indicating that a media item with a greatest confidence rating is not the media item desired for playback according to an embodiment of the present disclosure.

FIG. 4 shows a flow chart for an example method 400 for receiving and responding to user input indicating that a media item with a greatest confidence rating is not the media item desired for playback. Method 400 may be implemented in the form of instructions stored on a storage machine and executed by a logic machine, for example storage machine 920 and logic machine 910 as shown in FIG. 9. For example, computer system 18 may include a storage machine holding instructions for method 400 and a logic machine configured to execute the instructions. Method 400 may be run as a subroutine of methods 200 and/or 300, or may be run independently.

At 410, method 400 may include receiving a digital representation of a user command indicating a media item the user desires to playback. As described with regards to FIG. 1, the user command may include multiple command components. The user command may include a primary command component, which directs the computer system to engage in an active input mode. The user command may then include a secondary command component, which provides an application-specific command, for example, indicating the user's desire to playback a media item. The user command may include a tertiary component, where the user provides identifying information for the media item the user desires the computer system to playback. The user command may be input in the form of a speech command, a gesture command, or a command through a traditional user-input device coupled to the computer system. The user command may then be converted to a digital representation by vision subsystem 24, listening subsystem 26, and/or user input subsystem 22.

At 420, method 400 may include determining a confidence rating for each of a plurality of different media items. As described with regards to FIG. 2, the confidence rating may indicate a likelihood that the media item is named in the user command. The plurality of different media items may include media items in a user's media library, and may further include media items accessible via a media server. The confidence rating for a media item may include weighting media items in the user's media library more than media items accessible via the media server.

Figure 8:
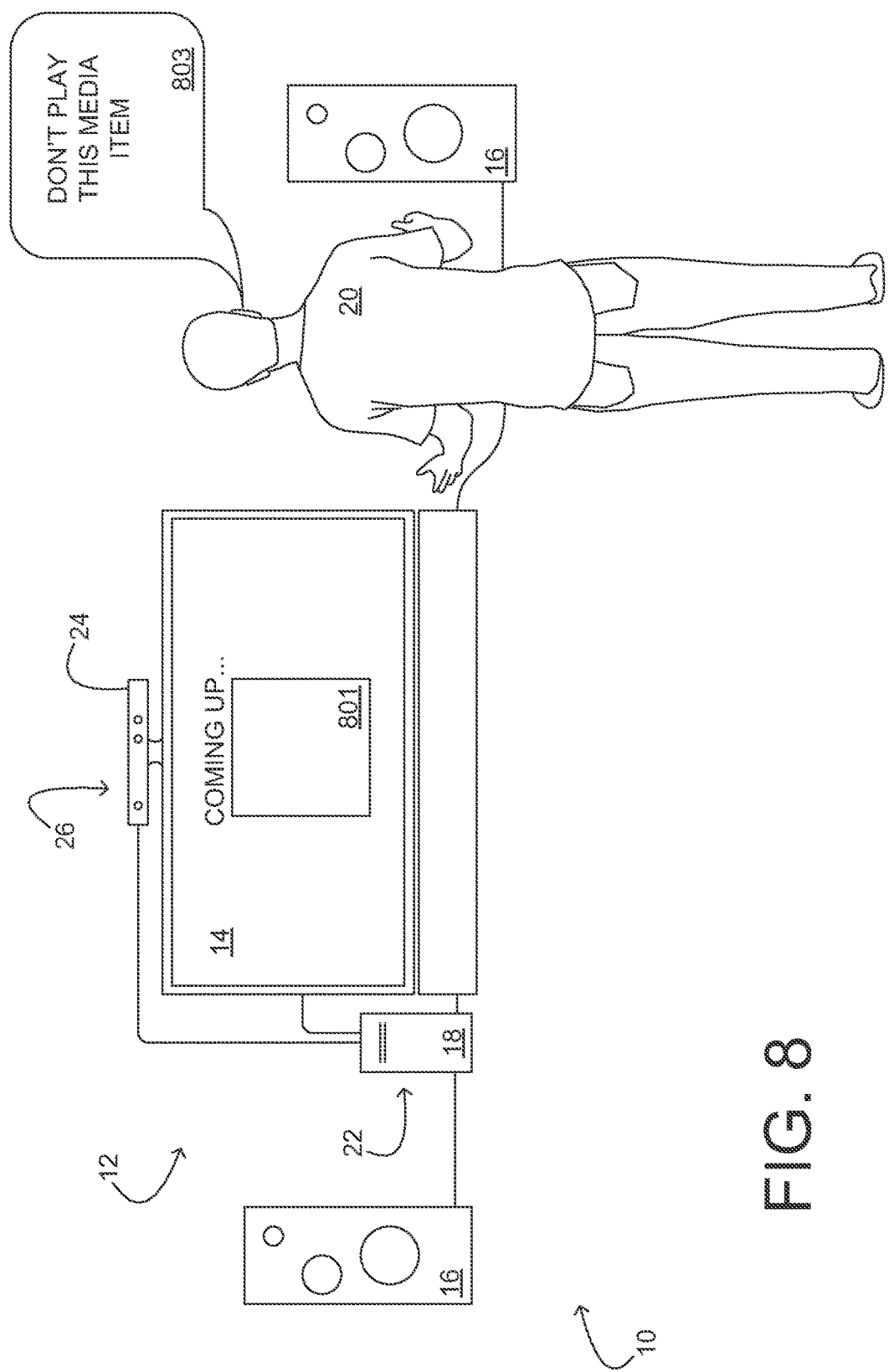
FIG. 8 schematically shows a control environment where a display is configured to display a media item queued for playback in accordance with an embodiment of the present disclosure.

At 430, method 400 may include indicating to a user that a media item with a greatest confidence rating is queued for playback. As shown in FIG. 8, indicating to a user that a media item with a greatest confidence rating is queued for playback may include visually displaying the media item with the greatest confidence rating 801 on display 14. The media item may be represented with text and/or graphics providing unique identifying information for the media item, for example, a song title and album cover. Additionally or alternatively, the media item may be indicated to a user aurally through loudspeakers 16.

Indicating to a user that a media item with a greatest confidence rating is queued for playback may include indicating the media item for a queuing interval prior to automatic playback of the media item. For example, the GUI may scroll the visual representation across the display. A smooth visual animation of the media item sliding off the screen may indicate to the user that playback of that media item is about to begin. In some examples, a timer or countdown clock may indicate that the playback of a media item is about to begin. In this way, the user is given a time interval to evaluate the selected media item, and determine whether computer system 18 selected the correct media item in accordance with the user's desires.

Returning to FIG. 4, after indicating to a user that a media item with a greatest confidence rating is queued for playback, method 400 may proceed to 440. At 440, method 400 may include detecting user input indicating not to play the media item queued for playback. Such user input may take the form of spoken commands, gesture commands, commands given through traditional user input devices, and/or other suitable modalities. Using the example of FIG. 8, the user may deliver a speech command 803 indicating not to play the media item queued for playback ("Don't playback this media item").

Returning to FIG. 4, if user input indicating not to play the media item queued for playback is not detected, method 400 may proceed to 445. At 445, method 400 may include automatically playing back the media item with a greatest confidence rating following a queuing time interval.

If user input indicating not to play the media item queued for playback is detected, method 400 may proceed to 450. At 450, method 400 may include canceling playback of the media item with the greatest confidence rating. Playback may be cancelled prior to expiration of the queuing time interval or after the media item begins playback.

Continuing at 460, method 400 may include indicating to the user a plurality of media items with the next greatest confidence ratings. In some embodiments, the plurality of media items with the next greatest confidence ratings does not include the media item with the greatest confidence rating. In this way, the media item rejected by the user will not be indicated to the user again. In some embodiments, the plurality of media items with the next greatest confidence ratings does not include more than one copy of a media item. For example, if the media item is both located in the user's media library and accessible via the media server, only one instance of the media item will be indicated to the user.

As discussed herein with regards to FIG. 7, a plurality of media items from a user's library 701 may be visually displayed alongside a plurality of media items available on a media server 702. In some examples, the plurality of media items with the next greatest confidence ratings may be presented in a non-visual manner.

Returning to FIG. 4, after indicating a plurality of media items with the next greatest confidence ratings, method 400 may proceed to 470. At 470, method 400 may include receiving user input selecting one of the plurality of media items for playback.

As shown in FIG. 7, user input may include speech input in the form of speech command 703. In this example, listening subsystem 26 is automatically engaged in active listening mode upon entering disambiguation mode. As such, speech command 703 may not necessarily include a primary command component.

In some examples, the user may not identify the media item desired for playback among the plurality of media items presented. The user may then request additional or alternative media items with a command, such as a speech command (e.g. "show more examples") or a gesture command, such as swiping. A plurality of media items with the next greatest confidence ratings may then be indicated to the user.

Returning to FIG. 4, after receiving user input selecting one of the plurality of media items for playback, method 400 may proceed to 480. At 480, method 400 may include playing back the selected media item or plurality of media items included in a parent container.

Receiving user input indicating not to play a media item may not be limited to the queuing time interval. For example, the user may indicate not to play a media item after the computer system has begun playback of the media item. After receiving the user input, the computer system may indicate to the user a plurality of media items with the next greatest confidence intervals.

Similarly, user input indicating to play a media item may be received and interpreted at any point during the flow, including during playback, during the queuing time interval, during disambiguation mode, etc.

Instances of the user indicating not to play a media item may be recorded. If the user subsequently selects another media item for playback, that selection may be recorded and used as an item identifier or parent container identifier in the user-specific grammar library in order to refine the confidence rating for the media item or parent container upon subsequent user commands.

Turning to FIG. 5, as described herein, user-specific grammar library 500 may include identifiers for media items 515 and parent containers 512 located in a user's media library 510, and may also include identifiers for media items 525 and parent containers 522 located on a media server. Further, the user-specific grammar library may mine data from the user's online network history 530, the user's computer usage history 540, the user's social graph 550, and/or one or more online social networks 570 outside the user's social graph, in order to discern additional item identifiers and parent container identifiers, and/or to give additional weight to media items and parent containers during the generation of confidence ratings. The examples given herein for media item identifiers and parent container identifiers that may comprise a user-specific grammar library are provided as an illustrative representation, and should not be considered an exhaustive list of terms that could be included in any such user-specific grammar library.

The user-specific grammar library may include media item identifiers 532 and parent container identifiers 535 related to a user's online network usage history 530. For example, a user may have recently browsed an artist's website, bought tickets to a concert, read a review of an album, etc. that may indicate the user's interest in a media item or parent container. The user-specific grammar library may thus mine identifiers from the pertaining to these media items and/or parent containers and give additional weight to these media items and/or parent containers when determining confidence ratings. In another example, the user may have recently watched a streaming video with a soundtrack. This information may be mined by the user-specific grammar library, such that the user may identify a media item without naming the media item or parent container (e.g. "play the song from the dancing cat video").

The user-specific grammar library may include media item identifiers 542 and parent container identifiers 545 related to a user's online computer usage history 540. For example, media items and/or parent containers recently selected for playback may be weighted more than media items and/or parent containers that have not been recently played back when determining confidence ratings. In another example, artists related to, or from a similar genre to artists whose songs have recently been selected for playback may be prioritized over unrelated artists. In yet another example, a user may have recently watched a movie or played a video game with a soundtrack. This information may be mined by the user-specific grammar library, such that the user may identify a media item without naming the media item or parent container (e.g. "play the song from the closing credits of the movie I watched last night"). The user's media consumption history may include media items such as music, movies, games, etc. that may be cataloged as part of a user's computer usage history, and/or a user's network usage history. Media item identifiers and parent container identifiers relating to a user's media consumption history may comprise merged results from the user's computer usage history and the user's network usage history. In this way, the user-specific grammar library may reflect that a user who has recently played a video game is more likely to search for media items comprising the soundtrack to the video game, regardless of whether the video game was played locally, or over a network.

A user's social graph 550 may include friends and relatives of the user who communicate with the user frequently, and/or use similar programs for media item playback. The user-specific grammar library may include media item identifiers 559 and parent container identifiers 557 related to media libraries belonging to members of a user's social graph 555. For example, friends of the user with whom the user frequently communicates online may make their media libraries public, and/or available for data mining. Media items and parent containers found in the media libraries of one or more member of the user's social graph may be weighted more than media items and parent containers not found in the media libraries of one or more member of the user's social graph. In some embodiments, members of a user's social graph may be able to share media items from their media libraries. In such embodiments, media items and parent containers from social graph member's media libraries may be weighted more than media items and parent containers accessible only through a media server. Additional weight may be given to media items and/or parent containers identified as belonging to the media libraries of multiple members of the user's social graph.

Additionally, the user-specific grammar library may include media item identifiers 565 and parent container identifiers 562 related to network activity of members of a user's social graph. For example, a member of the user's social graph may have recently browsed an artist's website, bought tickets to a concert, read a review of an album, etc. that may indicate the social graph member's interest in a media item or parent container. The user-specific grammar library may thus mine identifiers pertaining to these media items and/or parent containers and give additional weight to these media items and/or parent containers when determining confidence ratings. Additional weight may be given to media items and/or parent containers identified as pertaining to multiple social graph members' network activity.

The user-specific grammar library may further include media item identifiers 575 and parent container identifiers 572 related to media items trending outside of the user's social graph on an online social network 570. Online social network 570 may include one or more social networks with which the user has an account, and/or may include a social network related to media server 520. User-specific grammar library may mine data pertaining to media items and parent containers that are frequently mentioned on online social network 570, and may further include data pertaining to media items and parent containers frequently downloaded or played back through media server 520. In this way, even if members of a user's social graph have not discussed or played back a particular media item or parent container, the user may identify media items popular among the online community without naming the media item or parent container (e.g. "play the most downloaded song from last week"). Additionally, items frequently discussed or downloaded from the media server may be given higher weight when presenting results from the media server in a disambiguation mode.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, user input subsystem 940, communication subsystem 970, and/or other components not shown in FIG. 9. User input subsystem 940 may include vision subsystem 950, and may also include listening subsystem 960.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 930 may be used to present a visual representation of data held by storage machine 920. This visual representation may take the form of a graphical user interface (GUI) 935. As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, user input subsystem 940 may comprise or interface with one or more user-input devices such as a keyboard, mouse, touch screen, or game controller. In some embodiments, the input subsystem may comprise or interface with selected natural user input (NUI) componentry 955. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

For example, user input subsystem 940 and/or computing system 900 may further include vision subsystem 950. Vision subsystem 950 may include an infrared light and a depth camera (also referred to as an infrared light camera) configured to acquire video of a scene including one or more human subjects. The video may comprise a time-resolved sequence of images of spatial resolution and frame rate suitable for the purposes set forth herein. The depth camera and/or a cooperating computing system (e.g., computing system 900) may be configured to process the acquired video to identify one or more postures and/or gestures of the user, determine a location of and track movements of a user's mouth, tongue, and/or throat, and to interpret such postures and/or gestures as device commands configured to control various aspects of computing system 900. Vision subsystem 950 may further include a visible light camera (e.g., RGB camera). Time-resolved images from color and depth cameras may be registered to each other and combined to yield depth-resolved color video. The nature and number of cameras may differ in various depth cameras consistent with the scope of this disclosure. In general, one or more cameras may be configured to provide video from which a time-resolved sequence of three-dimensional depth maps is obtained via downstream processing. As used herein, the term 'depth map' refers to an array of pixels registered to corresponding regions of an imaged scene, with a depth value of each pixel indicating the depth of the surface imaged by that pixel. 'Depth' is defined as a coordinate parallel to the optical axis of the depth camera, which increases with increasing distance from the depth camera.

User input subsystem 940 and/or computing system 900 may further include listening subsystem 960. Listening subsystem 960 may include one or more microphones. One or more microphones may determine directional and/or non-directional sounds coming from users in the physical space and/or other sources. Audio data may be recorded by the one or more microphones. Such audio data may be determined in any suitable manner without departing from the scope of this disclosure. Listening subsystem 960 and/or user input subsystem 940 may be configured to convert the audio data into a digital representation of the audio data. Listening subsystem 960 and/or user input subsystem 940 may be configured to provide the digital representation of the audio data to logic machine 910, which may in turn provide the digital representation of the audio data to speech recognizer 925, which may be trained by a user-specific grammar library 927 to analyze the digital representation of the audio data as described herein.

When included, communication subsystem 970 may be configured to communicatively couple computing system 900 with one or more other computing devices. Communication subsystem 970 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network 980 such as the Internet.

Communication subsystem 970 may be configured to communicate with a media server 990 via network 980. Media server 990 may comprise a plurality of media files available for downloading to storage machine 920, and/or may comprise a plurality of media files that may be accessed by computing system 900 while communication subsystem 970 is actively engaged in communication with the media server.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method, comprising:
   receiving a digital representation of a spoken command;
   providing the digital representation to a speech recognizer trained with a user-specific grammar library;
   receiving from the speech recognizer a confidence rating for each of a plurality of different media items, the confidence rating indicating a likelihood that the media item is named in the spoken command;
   weighting each confidence rating based on one or more identifiers mined by the user-specific grammar library;
   narrowing the plurality of different media items to a selected media item based on the weighted confidence ratings;
   prior to playing the selected media item, providing to a user an identification of the selected media item and indicating that the selected media item is queued for automatic playback absent a user input from the user during a queuing time interval;
   absent the user input to cancel playback of the selected media item, automatically playing back the selected media item following the queuing time interval;
   cancel playback of the selected media item with the greatest confidence rating responsive to receiving the user input during the queuing time interval indicating to cancel playback of the selected media item with the greatest confidence rating; and
   indicate to the user a plurality of media items with the next greatest confidence ratings, excluding the selected media item with the greatest confidence rating.

2. The method of claim 1, wherein the user-specific grammar library includes item identifiers for a plurality of media items in a media library of the user.

3. The method of claim 2, wherein the user-specific grammar library further includes parent container identifiers for a plurality of parent containers comprising the plurality of media items in the user's media library.

4. The method of claim 3, further comprising:
   automatically playing back a plurality of media items included in a parent container if the parent container has a confidence rating greater than or equal to a greatest confidence rating of an individual media item.

5. The method of claim 3, wherein the user-specific grammar library includes item identifiers and parent container identifiers for media items found in media libraries belonging to members of a social graph of the user.

6. The method of claim 5, wherein the user-specific grammar library includes item identifiers and parent container identifiers for media items trending outside of the user's social graph on an online social network.

7. The method of claim 6, wherein the user-specific grammar library includes item identifiers and parent container identifiers for media items related to a computer usage history of the user and/or an online network usage history of the user.

8. The method of claim 1, further comprising:
   automatically playing back the selected media item only when a weighted confidence rating for the selected media item is larger than a threshold.

9. The method of claim 8, further comprising:
   indicating to the user a plurality of media items with weighted confidence ratings closest to the threshold if no individual media item has a weighted confidence rating larger than the threshold;
   receiving a second user input choosing one of the plurality of media items with weighted confidence ratings closest to the threshold for playback; and
   playing back the chosen media item.

10. A computer system, comprising:
    a logic machine; and
    a storage machine holding instructions that, when executed by the logic machine, cause the logic machine to:
    receive a digital representation of a user command from a user;
    determine a confidence rating for a plurality of different media items, the confidence rating indicating a likelihood that the media item is named in the user command;
    narrow the plurality of different media items to a selected media item having a greatest confidence rating;
    prior to playing the selected media item with the greatest confidence rating, provide to the user an identification of the selected media item with the greatest confidence rating and indicate that the selected media item with the greatest confidence rating is queued for automatic playback absent user input during a queuing time interval;

cancel playback of the selected media item with the greatest confidence rating responsive to receiving the user input during the queuing time interval indicating to cancel playback of the selected media item with the greatest confidence rating; and indicate to the user a plurality of media items with the next greatest confidence ratings, excluding the selected media item with the greatest confidence rating.

11. The computer system of claim 10, where the plurality of different media items includes media items in a media library of the user.

12. The computer system of claim 11, further comprising a communications system in communication with a media server, and wherein the plurality of different media items further includes media items accessible via the media server.

13. The computer system of claim 12, wherein determining the confidence rating for a media item includes weighting media items in the user's media library more than media items accessible via the media server.

14. The computer system of claim 12, wherein the plurality of media items with the next greatest confidence ratings does not include more than one copy of a media item.

15. The computer system of claim 10, where the storage machine further holds instructions that, when executed by the logic machine, cause the logic machine to:

interpret spoken commands of the user as input indicating not to playback the selected media item with the greatest confidence rating.

16. The computer system of claim 10, where the storage machine further holds instructions that, when executed by the logic machine, cause the logic machine to:

interpret gesture commands of the user as input indicating not to playback the selected media item with the greatest confidence rating.

17. A computer system including a logic machine, and a storage machine holding instructions that, when executed by the logic machine, cause the logic machine to:

receive a digital representation of a spoken command;

provide the digital representation to a speech recognizer trained with a user-specific grammar library of a user;

receive from the speech recognizer a confidence rating for each of a plurality of different media items, the confidence rating indicating a likelihood that the media item is named in the spoken command;

narrow the plurality of different media items to a selected media item having a greatest confidence rating;

prior to playing the selected media item with the greatest confidence rating, provide to the user an identification of the selected media item with the greatest confidence rating and indicate that the selected media item with the greatest confidence rating is queued for playback;

absent a user input from the user to cancel playback of the selected media item with the greatest confidence rating, automatically playback the selected media item with the greatest confidence rating following a queuing time interval;

cancel playback of the selected media item with the greatest confidence rating responsive to the user input prior to expiration of the queuing time interval;

indicate to the user a plurality of different media items with the next greatest confidence ratings;

receive a second user input choosing one of the plurality of media items with the next greatest confidence ratings for playback; and playback the chosen media item.

18. The computer system of claim 17, wherein the user-specific grammar library includes a plurality of item identifiers for a plurality of media items available for playback, and further includes a plurality of parent container identifiers for a plurality of parent containers comprising the plurality of media items available for playback.

* * * * *